United States Patent
Käding et al.

(10) Patent No.: US 8,691,468 B2
(45) Date of Patent: Apr. 8, 2014

(54) FUEL CELL STACK, AND METHOD FOR THE PRODUCTION OF A FUEL CELL STACK

(75) Inventors: Stefan Käding, Zerrenthin (DE); Jens Hafemeister, Neustrelitz (DE); Uwe Bergmann, Neustrelitz (DE); Gregor Holstermann, Neubrandenburg (DE)

(73) Assignees: Enerday GmbH, Neubrandenburg (DE); Webasto AG, Stockdorf (DE); Staxera GmbH, Dresden (DE)

( * ) Notice: Subject to any disclaimer, the term of this patent is extended or adjusted under 35 U.S.C. 154(b) by 459 days.

(21) Appl. No.: 12/937,750

(22) PCT Filed: Mar. 30, 2009

(86) PCT No.: PCT/DE2009/000443
§ 371 (c)(1),
(2), (4) Date: Oct. 14, 2010

(87) PCT Pub. No.: WO2009/127189
PCT Pub. Date: Oct. 22, 2009

(65) Prior Publication Data
US 2011/0039180 A1 Feb. 17, 2011

(30) Foreign Application Priority Data

Apr. 14, 2008 (DE) .......................... 10 2008 018 630

(51) Int. Cl.
*H01M 2/04* (2006.01)
(52) U.S. Cl.
USPC .............................. 429/469; 429/535; 429/508
(58) Field of Classification Search
None
See application file for complete search history.

(56) References Cited

U.S. PATENT DOCUMENTS

| | | | | |
|---|---|---|---|---|
| 4,476,196 | A | * | 10/1984 | Poeppel et al. ............... 429/458 |
| 2005/0263393 | A1 | * | 12/2005 | Paz ............................... 204/400 |

FOREIGN PATENT DOCUMENTS

| | | | |
|---|---|---|---|
| DE | 43 24 907 | A1 | 1/1995 |
| DE | 19650903 | A1 | 6/1998 |
| DE | 10 2004 037 678 | A1 | 3/2006 |
| DE | 102007002286 | A1 | 7/2008 |
| EP | 0374636 | A1 | 6/1990 |
| GB | 2447136 | A1 | 9/2008 |
| JP | 7335243 | A | 12/1995 |
| JP | 8273694 | A | 10/1996 |
| JP | 11224684 | A | 8/1999 |
| JP | 2008034373 | A | 2/2008 |
| JP | 2010516038 | A | 5/2010 |
| JP | 2010519716 | A | 6/2010 |
| WO | WO 2008028440 | A1 | 3/2008 |

OTHER PUBLICATIONS

International Search Reported dated Aug. 21, 2009.

* cited by examiner

*Primary Examiner* — Maria J Laios
(74) *Attorney, Agent, or Firm* — Fitch Even Tabin & Flannery LLP

(57) ABSTRACT

The invention relates to a fuel cell stack comprising a base plate supporting fuel cells and a cap of an electrically insulating material, particularly of ceramics, for electrically insulating the fuel cells stacked on top of each other partially enveloping the fuel cells stacked on top of each other. According to the invention it is contemplated that a metal cap provided for guiding cathode gas envelops the cap including the fuel cells together with the base plate and that the metal cap is attached to the base plate in a sealed manner. The invention further relates to a method for producing a fuel cell stack.

16 Claims, 3 Drawing Sheets

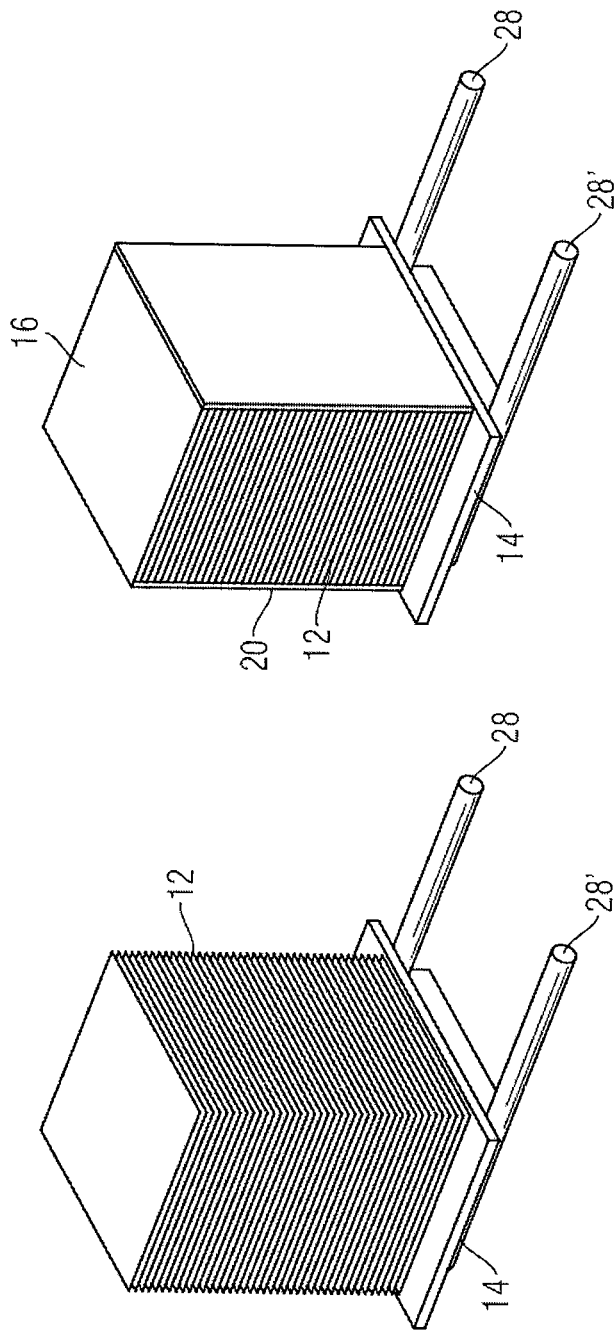

FUEL CELL STACK, AND METHOD FOR THE PRODUCTION OF A FUEL CELL STACK

CROSS-REFERENCE TO RELATED APPLICATIONS

This Application is a U.S. national phase application filed under 35 U.S.C. §371 of International Application No. PCT/DE2009/000443, filed Mar. 30, 2009, designating the United States, which claims priority from German Patent Application No.: DE 10 2008 018 630.9, filed Apr. 14, 2008, which are hereby incorporated herein by reference in their entirety for all purposes.

The invention relates to a fuel cell stack comprising a base plate supporting fuel cells and a cap partially enveloping the fuel cells stacked on top of each other and formed of an electrically insulating material, particularly of ceramics, for electrically insulating the fuel cells stacked on top of each other.

The invention further relates to a method for manufacturing a fuel cell stack comprising a base plate supporting fuel cells, a cap partially enveloping the fuel cells stacked on top of each other and formed of an electrically insulating material, particularly of ceramics, for electrically insulating the fuel cells stacked on top of each other and a metal cap provided for guiding cathode gas which, together with the base plate, envelops the cap including the fuel cells, the metal cap being attached to the base plate in a sealed manner.

The fuel cell technology for generating electric power is, due to the direct conversion of chemical into electric power, theoretically significantly more efficient than conventional methods for generating electric power, for example an internal combustion engine or a gas turbine including a connected generator. Among the most advanced are, at present, the so-called SOFC fuel cells which belong to the class of the high temperature fuel cells since they have, due to their design, operating temperatures of 650° C. to approximately 1000° C. The high operating temperatures of the SOFC fuel cell systems limit the materials usable for their construction and additionally create high stresses acting on the materials, for example at the connecting points of components manufactured of different materials due to different thermal expansion coefficients.

The functional principle of all fuel cells is based on that two different process gasses, for example a hydrogen-rich fuel gas and an oxygen-rich gas serving as an oxidant, are separately guided past an active layer, an electric voltage of approximately 0.7 V developing perpendicular to said layer due to the reaction taking place and a usable electric current being producible. Since the voltage producible by a single fuel cell is relatively small usually many individual fuel cells are coupled in series, the stacking of the individual fuel cells on top of each other in a fuel cell stack having proven useful. Due to the stacking of the individual fuel cells, however, the supply of the different process gasses also referred to as anode gas and cathode gas has become more difficult in view of the sealing of the anode gas space with respect to the cathode gas space. The efficiency of the fuel cell stack, however, decisively depends on that the anode gas is guided in a gastight manner so as to be separated from the cathode gas and that the reaction only takes place via the reaction surfaces provided for this purpose.

One possibility for supplying the fuel cell stack with anode gas consists in the arrangement of a central supply line inside of the fuel cell stack, perpendicular to the stacking direction of the individual fuel cells, which is lead through the individual layers of the fuel cell stack via openings. In this connection attention has to be paid to a gastight connection of the individual layers to the supply line to avoid a mixing of cathode gas and anode gas. It is feasible to analogously provide another supply line for supplying the fuel cell stack with cathode gas. Alternatively, however, a so-called open cathode may also be used, the cathode gas being supplied on one side of the fuel cell stack and the exhausted cathode gas leaving the fuel cell stack on the opposite side of the fuel cell stack. In case of an open cathode thus a part of the openings for a supply line may be omitted which considerably simplifies the production. However, to be able to have the cathode gas flow through the fuel cell stack in parallel to the individual levels of the fuel cell stack an external sealing of the fuel cell stack is required to prevent the cathode gas from undesirably flowing around the fuel cell stack and not passing through it. To this end a ceramic cap may be provided serving, on the one hand, to guide the cathode gas through the fuel cell stack and, on the other hand, to electrically insulate the individual fuel cells.

In this connection, however, the different thermal expansion coefficients of such a cap and the fuel cell stack prove to be particularly problematic which is why the two components have to be connected to each other in a sliding manner. A gastight design of the connection can therefore not be guaranteed. For this reason the integration of a fuel cell stack comprising an external cathode gas guidance into a fuel cells system is particularly complicated.

It is the object of the present invention to at least partially solve the problem described above.

Said object is solved by the features of the independent claims.

Advantageous embodiments and further developments of the invention will become obvious from the dependent claims.

The fuel cell stack according to the invention is based on the state of the art in that a metal cap provided for guiding cathode gas envelops the cap including the fuel cells together with the base plate and in that the metal cap is attached to the base plate in a sealed manner. The provision of a metal cap attached to the base plate supporting the fuel cell stack in a sealed manner enables a tight encapsulation of the fuel cell stack in a simple manner. In this way the integration of a fuel cell stack into a fuel cell system is considerably facilitated since the supply and discharge of anode or cathode gas only takes place via the ports provided in the metal cap and/or the base plate for this purpose.

Preferably a sealing is provided between the cap and the fuel cells. The provision of a sealing between the cap and the fuel cells enables, in particular, an enhanced guidance of cathode gas through the fuel cell stack without a loss of performance by potential bypasses through which the cathode gas might flow past the fuel cell stack. The sealing and the cap may also be formed as a single component to further facilitate the production.

In this case it is particularly preferred that the sealing comprises ceramic paper. The use of ceramic paper as a sealing material between the fuel cell stack and the cap facilitates, in particular, the initial application of the sealing since the ceramic paper can be processed like normal paper before the activation of the fuel cell stack or the first heating.

Usefully it is contemplated that the metal cap applies a defined bias on the cap including the fuel cells. Many fuel cell stacks are kept under a defined bias during the manufacturing phase to prevent possible micro fractures which might result in a gas-leakiness and would thereby render the entire fuel cell stack useless. Often a separate biasing device is provided for generating the defined bias which may be omitted if metal cap itself replaces the function of the biasing device and applies the required bias to the fuel cell stack. In this way it is also ensured that the cap abuts on the surface of the stack of fuel cells.

In this connection it is particularly preferred to contemplate that the metal cap comprises an elastic metal foil in its part opposing the base plate which foil reproduces the contours of the cap including the fuel cells. An elastic metal foil reproducing the contours of the cap including the fuel cells when applied will, in particular, enable a neutralisation of the different thermal expansions of the cap including the fuel cells and the metal cap during the operation the fuel cell stack. The different longitudinal expansions will, in this case, be neutralised by the flexibility of the elastic metal foil which absorbs the deformations. This particularly enables the permanently tight coupling between the metal cap and the base plate, the cap together with the fuel cells dividing the space inside of the metal cap into two sections connected only via the cathode gas ducts in the fuel cells. The reproduction of the contour is effected in connection with the bias of the metal cap due to the elasticity of the foil used.

Usefully it is contemplated in this connection that a bracing of the fuel cell stack is provided, the force staying the fuel cell stack being transmitted to the fuel cells via a punch simultaneously flatly pressing the elastic metal foil onto the cap with the fuel cells. A bracing of the fuel cell stack differing from the bias applied by the metal cap is common to ensure a sufficient stability of the arrangement, particularly a sufficient gas-tightness of the individual fuel cells during the operation of the fuel cell stack. The plane application of the staying force applied by the bracing via a punch ideally simultaneously enables the plane pressing of the elastic metal foil onto the cap including the fuel cells the position of which is thus fixed to the stack of fuel cells. Different longitudinal thermal expansions of the metal cap and of the cap including the fuel cells will therefore now only be compensated by the elasticity of the metal foil disposed adjacent to the stack of fuel cells or the cap. Further the contact pressing of the elastic metal foil will increase the gas-tightness of the external cathode gas duct since a bypassing of the fuel cell stack by the cathode gas is less probable due to the surface pressure. In case of the external cathode gas guidance the elastic metal foil is not abutting on the sides of the stack of fuel cells provided for the supply or discharge of cathode gas.

It may further be contemplated that the base plate comprises a port for a media supply and/or a media discharge. The provision of a media supply and/or a media discharge in the base plate, for example an anode gas supply and/or an anode gas discharge, is particularly advantageous if the supply of the fuel cell stack with anode gas is effected via a central supply line lead through the fuel cell stack in the vertical direction relative to the stacking plane via openings. Ports for a cathode gas supply or cathode gas discharge may also be integrated in the base plate according to the requirements.

It may further be contemplated that the metal cap comprises a port for a media supply and/or a media discharge. Particularly in case of an open cathode gas guidance realised by the metal cap ports for a media supply and/or a media discharge in the metal cap may be advantageous.

Preferably it is contemplated that all ports for the media supply and the media discharge are disposed parallel to each other.

In this connection it is particularly advantageous that all ports for the media supply and the media discharge are disposed on one side of the fuel cell stack. If the ports for the media supply and/or the media discharge are not only parallel to each other but also disposed on one single side of the fuel cell stack the integration of the fuel cell stack into a fuel cell system is particularly facilitated.

The fuel cell system according to the invention is characterised in that it comprises a fuel cell stack of the type described above.

The generic method for producing a fuel cell stack is further developed in that it comprises the following steps:
  stacking of fuel cells on the base plate,
  fitting of the cap partially enveloping the fuel cells arranged so as to be stacked on top of each other,
  sealing of the contact surfaces between the fuel cells and the cap,
  fitting of a metal cap onto the cap partially enveloping the fuel cells stacked on top of each other,
  fixing the metal cap while sealing it on the base plate under a defined bias.

In this way the advantages and particularities of the fuel cell stack according to the invention are also realised within the framework of a method for producing a fuel cell stack. This also applies to the particularly preferred embodiments of the method according to the invention described below.

It is usefully further developed in that the step of sealing of the contact surfaces between the fuel cells and the cap contemplates the use von ceramic paper.

Preferably it is further contemplated that the step of fitting the metal cap comprises a pressing of an elastic metal foil disposed in the upper part of the metal cap onto the upper part of the cap partially including the fuel cells stacked on top of each other. Due to the pressing-on which, in particular, is carried out wrinkle-free, later occurring asymmetrical stresses acting on the elastic metal foil during the thermal expansion cycles of the fuel cell stack may be prevented.

In particular it may be contemplated that the step of fixing the metal cap on the base plate under a defined bias comprises the welding of the metal cap onto the base plate. The welding of the metal cap onto the base plate is a simple possibility for safely connecting the components while sealing them.

Usefully it is further contemplated that a bracing is arranged on the fuel cell stack which transmits the retaining force to the stacked fuel cells via a punch, the elastic metal foil being simultaneously flatly pressed onto the cap including the fuel cells.

A preferred embodiment of the invention will be described by way of example below in more detail with reference to the associated drawings in which:

FIG. 1 shows a base plate comprising individual fuel cells stacked on top of each other thereon;

FIG. 2 shows a stack of fuel cells on a base plate with a cap fitted thereon;

In the following drawings the same numerals denote the same or similar parts.

Figure 4:
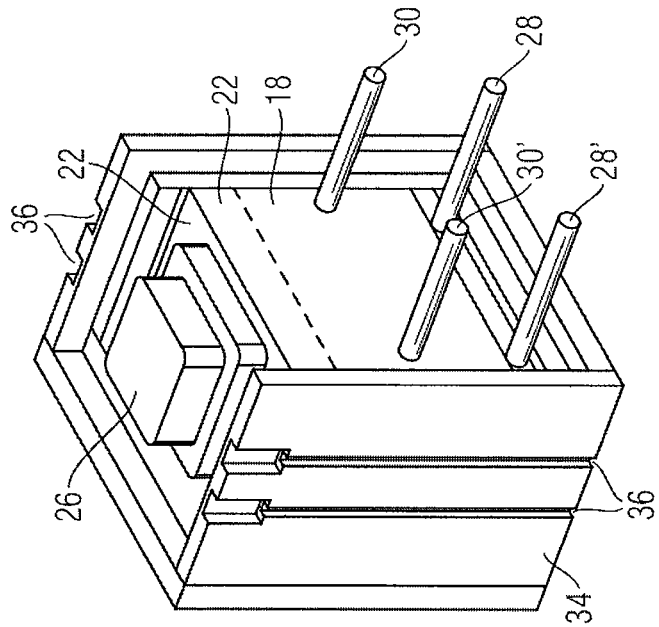
FIG. 4 shows a stack of fuel cells including an already partially mounted insulation disposed in a metal cap.

FIG. 1 shows a base plate including individual fuel cells stacked thereon on top of each other. FIG. 1 therefore shows a first manufacturing step for a fuel cell stack according to the invention. Individual fuel cells 12 are stacked on top of each other on a base plate 14 including ports 28, 28'. Via the port 28, for example, oxygen-rich fuel is supplied to the individual fuel cells 12 as anode gas. For this purpose at least one opening concealed by the fuel cells 12 is present in the base plate 14 which is connected to a central supply line. The invisible supply line is in a direct contact with all anode gas spaces of the fuel cells 12 stacked on top of each other via openings in the individual fuel cells 12. The discharge of exhausted anode gas is effected via an also invisible central discharge line analogously coupled to all anode gas spaces of the fuel cells 12 via openings. Opposite to the cathode gas spaces the openings are sealed in a gastight manner. Further the fuel cell fitted in the uppermost position does not have to be provided with openings in its cover plate, or a separate cover plate may be fitted onto the stack of fuel cells 12.

FIG. 2 shows a stack of fuel cells on a base plate including a cap fitted thereon. The second step for producing a fuel cell stack according to the invention comprises the fitting of a cap 16 of an electrically insulating material, preferably of ceramics or another material with at least similar features with respect to the thermal stability, the electrical insulation capability and the expansion in case of heating, on the fuel cells 12 stacked on top of each other on the base plate 14. The cap 16 only partially envelopes the stack of fuel cells 12. In particular two of the opposing sides of the stack of fuel cells 12 are not covered by the cap 16 while a sealing 20 preferably comprising ceramic paper or a sealing material having similar properties seals the contact surfaces of the cap 16 and the stack of fuel cells 12. The representation shown in FIG. 2 is particularly advantageous in connection with a so-called open open cathode in which an oxidant-rich cathode gas can flatly flow in on one side of the stack of fuel cells 12 and is flatly discharged from the stack of fuel cells 12 on the opposite side. Among other things the sealing 20 helps to prevent the cathode gas from bypassing the stack of fuel cells 12.

Figure 3:
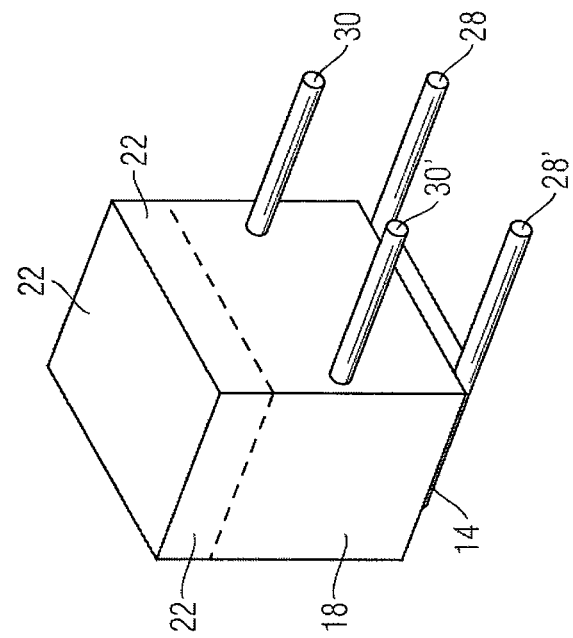
FIG. 3 shows a stack of fuel cells in a metal cap.

FIG. 3 shows a stack of fuel cells in a metal cap. A metal cap 18 is fitted on the base plate 14 on which the now no longer visible fuel cells are stacked on top of each other and preferably welded onto the base plate 14 in a sealed manner. Upon a comparison of the dimensions of the stack of fuel cells to be seen in FIG. 2 it will become obvious that ports 30, 31 inside of the metal cap 18 are not covered by the stack of fuel cells and the cap. Cathode gas, for example air, supplied via the port 30 may therefore be supplied to the stack of fuel cells open on two sides according to FIG. 2 from the open rear side not visible in FIG. 2 and discharged again from the stack of fuel cells via the open front side visible in FIG. 2. Thereafter the exhausted cathode gas may be discharged from the metal cap 18 via the port 30'. The fuel cell stack shown therefore operates with a so-called open cathode. In the upper section of the metal cap 18 an elastic metal foil 22 is provided which forms the cover and the upper section of the metallic cap 18 shown as side walls in FIG. 3. The thickness of the elastic metal foil 22 may range from 0.05 mm to 0.7 mm, a thickness from 0.1 mm to 0.5 mm being preferred and a thickness of 0.2 mm being particularly preferred. In the extreme case even the entire metal cap 18 could be formed of the elastic metal foil 22. The metal cap 18 serves as the cathode gas duct and may already entirely detect the contour of the cap including the fuel cells due to the bias so that an abutment of the cap on the fuel cells stacked on top of each other is ensured.

FIG. 4 shows a stack of fuel cells arranged in a metal cap and including a partially mounted insulation. The next step of the production of a fuel cell stack according to the invention is the attachment of an insulation 34 including recesses 36 for a permanent bracing of the intermediate product shown in FIG. 3. The insulation 34 including the recesses 36 is, in this case, disposed on the metal cap 18 as shown in FIG. 4, a punch 36 for uniformly applying a staying force to the stack being arranged on the side of the stack of fuel cells opposed to the no longer visible base plate. The punch 26 will, after the installation of a permanent bracing, simultaneously flatly press the metal foil 22 onto the cap and thus fix the elastic metal foil 22. This, on the one hand, serves to prevent undesired cathode gas flows from bypassing the stack of fuel cells and, on the other hand, to better compensate deformations by the sections of the elastic metal foil 22 not fixed by the punch. These are substantially the foil portions disposed adjacent to the stack.

Figure 5:
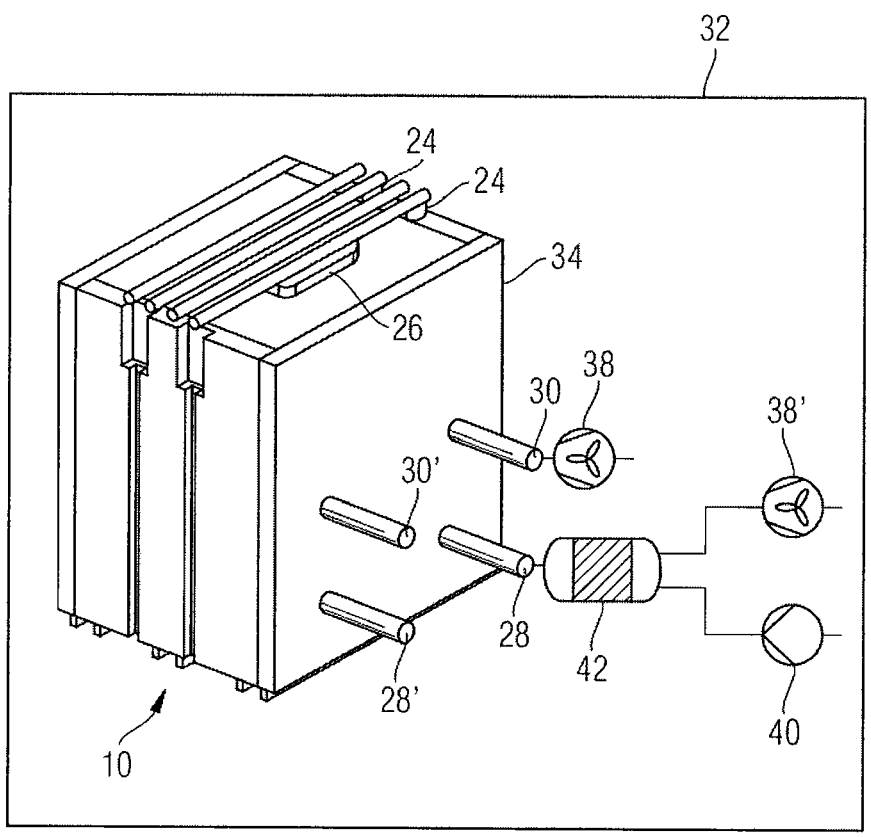
FIG. 5 shows a fuel cell system including a finished fuel cell stack.

FIG. 5 shows a fuel cell system comprising a finished fuel cell stack. A fuel cell system 32 comprising a fuel cell stack 10 is supplied with oxygen-rich cathode gas, in this case air, via a ventilator 38 and a port 30, and exhausted cathode gas is discharged via the port 30'. Required anode gas is supplied to a reformer 42 in the form of hydrogen-rich reformate via a port 28 by a ventilator 38' and a fuel pump 40. The exhausted anode gas is discharged via a port 28'. The fuel cell stack 10 is shown with a fully closed insulation 34, an external bracing 24 which, for example, uses spring forces for generating the staying force flatly transmitting a permanently required staying force to the stack of individual fuel cells disposed inside of the fuel cell stack 10 via a punch 26. The bracing 24 maintains the bias applied by the metal cap during the lifetime of the fuel cell stack 10. It is feasible to design the bracing 24 not as an external bracing outside of the insulation 34 but as an internal bracing under the insulation 34.

The features of the invention disclosed in the above description, in the drawings as well as in the claims may be important for the realisation of the invention individually as well as in any combination.

The invention claimed is:

1. A fuel cell stack comprising
a base plate supporting fuel cells;
wherein the base plate is not a fuel cell;
a cap partially enveloping the fuel cells stacked on top of each other and formed of an electrically insulating material for electrically insulating the fuel cells stacked on top of each other, wherein two faces of the fuel cell stack that are opposite to each other are not enveloped by the cap;
wherein a metal cap provided for guiding cathode gas envelops the cap including the fuel cells together with the base plate; and
wherein the metal cap is fitted on and attached to the base plate so as to be sealed.

2. The fuel cell stack of claim 1, characterised in that a sealing is provided between the cap and the fuel cells.

3. The fuel cell stack of claim 2, characterised in that the sealing comprises ceramic paper.

4. The fuel cell stack of claim 1, characterised in that the metal cap applies a defined bias onto the cap including the fuel cells.

5. The fuel cell stack of claim 1, characterised in that the metal cap comprises a flexible metal foil reproducing the contours of the cap including the fuel cells in its portion opposing the base plate.

6. The fuel cell stack of claim 5, characterised in that a bracing of the fuel cell stack is provided, the force staying the fuel cell stack being transmitted to the fuel cells via a punch which simultaneously flatly presses the flexible metal foil against the cap including the fuel cells.

7. The fuel cell stack of claim 1, characterised in that the base plate comprises a port for a media supply and/or a port for media discharge.

8. The fuel cell stack of claim 1, characterised in that the metal cap comprises a port for a media supply and/or a port for media discharge.

9. The fuel cell stack of claim 7, characterised in that the port for the media supply and the port for the media discharge are arranged parallel to each other.

10. The fuel cell stack of claim 7, characterised in that all of the port for the media supply and the port for the media discharge are arranged on one side the fuel cell stack.

11. A fuel cell system comprising a fuel cell stack of claim 1.

12. A method for manufacturing a fuel cell stack comprising
- a base plate supporting fuel cells, wherein the base plate is not a fuel cell;
- a cap of an electrically insulating material for electrically insulating the fuel cells stacked on top of each other partially enveloping the fuel cells stacked on top of each other, wherein two faces of the fuel cell stack that are opposite to each other are not enveloped by the cap;
- a metal cap provided for guiding cathode gas and enveloping the cap including the fuel cells together with the base plate, the metal cap being fitted on and attached to the base plate in a sealed manner;

characterised in that it comprises the following steps:
- stacking of fuel cells onto the base plate;
- fixing the cap partially enveloping the fuel cells stacked on top of each other;
- sealing the contact surfaces between the fuel cells and the cap;
- fixing a metal cap on the cap partially enveloping the fuel cells stacked on top of each other; and
- fixing the metal cap on the base plate in a sealed manner under a defined bias.

13. The method of claim 12, characterised in that the step of sealing the contact surfaces between the fuel cells and the cap comprises sealing of said contact surfaces with ceramic paper.

14. The method of claim 12, characterised in that the step of fixing the metal cap comprises a pressing of a flexible metal foil disposed in the upper part of the metal cap onto the upper part of the cap partially including the fuel cells stacked on top of each other.

15. The method of claim 12, characterised in that the step of fixing the metal cap on the base plate under a defined bias comprises the welding of the metal cap to the base plate.

16. The method of claim 12, characterised in that a bracing transmitting the staying force to the stacked fuel cells via a punch is arranged on the fuel cell stack, the flexible metal foil being simultaneously flatly pressed onto the cap including the fuel cells.

* * * * *